US009884777B2

United States Patent
Kim et al.

(10) Patent No.: US 9,884,777 B2
(45) Date of Patent: Feb. 6, 2018

(54) SEAWATER DESALINATION METHOD USING ARRANGEMENT OPTIMIZATION OF REVERSE OSMOSIS MEMBRANE MODULES

(71) Applicant: GWANGJU INSTITUTE OF SCIENCE AND TECHNOLOGY, Gwangju (KR)

(72) Inventors: Joon-Ha Kim, Gwangju (KR); Kwanho Jeong, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 262 days.

(21) Appl. No.: 14/582,565

(22) Filed: Dec. 24, 2014

(65) Prior Publication Data

US 2015/0251929 A1    Sep. 10, 2015

(30) Foreign Application Priority Data

Mar. 5, 2014    (KR) .................. 10-2014-0026034

(51) Int. Cl.
*C02F 1/44*    (2006.01)
*B01D 61/12*    (2006.01)
(Continued)

(52) U.S. Cl.
CPC .............. *C02F 1/441* (2013.01); *B01D 61/12* (2013.01); *C02F 1/008* (2013.01);
(Continued)

(58) Field of Classification Search
None
See application file for complete search history.

(56) References Cited

U.S. PATENT DOCUMENTS

2007/0272628 A1* 11/2007 Mickols .............. B01D 61/025
210/790

FOREIGN PATENT DOCUMENTS

KR    101187416 B1    10/2012

OTHER PUBLICATIONS (Supportive Materials on Aug. 28, 2013) 7th IWA Specialised Membrane Technology Conference and Exhibition for Water and Wastewater Treatment and Reuse, Conference—Symposium, Aug. 25 to 29, 2013, 2 pages, Toronto, Canada, International Water Association.

(Continued)

*Primary Examiner* — Krishnan S Menon
(74) *Attorney, Agent, or Firm* — Hauptman Ham, LLP

(57) ABSTRACT

Disclosed is a seawater desalination method. The method includes reading parameters representing properties of one or more membranes constituting a membrane combination to be applied to each membrane module; calculating water flux and salt flux of the membrane modules based on the read parameters; calculating a volumetric flow rate imbalance and a total permeate flow rate of the membrane modules based on the calculated water flux and salt flux; and determining a membrane combination having a minimum volumetric flow rate imbalance and a maximum total permeate flow rate based on the calculated volumetric flow rate imbalance and total permeate flow rate. Thus, it is possible to achieve arrangement optimization of reverse osmosis membrane modules.

7 Claims, 16 Drawing Sheets

(51) Int. Cl.
*C02F 103/08* (2006.01)
*C02F 1/00* (2006.01)
(52) U.S. Cl.
CPC .... *C02F 2103/08* (2013.01); *C02F 2209/005* (2013.01); *C02F 2209/006* (2013.01); *C02F 2209/40* (2013.01)

(56) References Cited

OTHER PUBLICATIONS (Supportive Materials on May 12, 2014) Cyprus Conference and Exhibition on Desalination for the Environment Clean Water and Energy, Conference—Symposium, May 11-15, 2014, 5 pages, Limassol, Cyprus, European Desalination Society.

\* cited by examiner

Equations for membrane mass transport $$J_w = A(\Delta p - \Delta \pi)$$

$$J_s = B\Delta c$$

$$\Delta \pi = \frac{N_{ion} R_g T \Delta c}{M_w}$$

Equations for feed channel conditions $$\Delta p(x,t) = \Delta p_0 - \frac{12 k_{spacer} \mu}{H^2} \int_0^x u(t,\zeta) d\zeta$$

$$c(x,t) = \frac{1}{u(x,t)} \left[ c_0 u_0 H - \int_0^x J_s(t,\zeta) d\zeta \right]$$

$$u(x,t) = u_0 - \frac{1}{H} \int_0^x v(\zeta,t) d\zeta$$

SEAWATER DESALINATION METHOD USING ARRANGEMENT OPTIMIZATION OF REVERSE OSMOSIS MEMBRANE MODULES

CROSS REFERENCE TO RELATED APPLICATION

This application claims the benefit of Korean Patent Application No. 10-2014-0026034, filed on Mar. 5, 2014, entitled "SEAWATER DESALINATION METHOD USING ARRANGEMENT OPTIMIZATION OF REVERSE OSMOSIS MEMBRANE MODULES", which is hereby incorporated by reference in its entirety into this application.

BACKGROUND

1. Technical Field

The present invention relates to a seawater desalination method and, more particularly, to a seawater desalination method using arrangement optimization of reverse osmosis (RO) membrane modules.

2. Description of the Related Art

Seawater desalination technology, which desalinates seawater to secure a lot of water resources regardless of seasons or weather conditions, aims to solve a problem of water shortage that has recently been on the rise. The seawater desalination technology has shorter construction period and lower initial investment costs than dams, and thus has been used as alternative technology for securing water resources while achieving low-energy consumption, stability, large-scale and environmentally friendliness.

A background technique of the present invention is disclosed in Korean Patent No. 10-1187416, entitled "SEAWATER DESALINATION METHOD USING PREDICTION MODEL AND APPARATUS PERFORMING THE SAME."

BRIEF SUMMARY

The present invention has been conceived to solve such problems in the art and it is an aspect of the present invention to provide a seawater desalination method using arrangement optimization of reverse osmosis (RO) membrane modules.

In accordance with one aspect of the present invention, a seawater desalination method includes: reading parameters representing properties of one or more membranes constituting a membrane combination to be applied to each membrane module; calculating water flux and salt flux of the membrane modules based on the read parameters; calculating a volumetric flow rate imbalance and a total permeate flow rate of the membrane modules based on the calculated water flux and salt flux; and determining a membrane combination having a minimum volumetric flow rate imbalance and a maximum total permeate flow rate based on the calculated volumetric flow rate imbalance and total permeate flow rate.

Determining a membrane combination having a minimum volumetric flow rate imbalance and a maximum total permeate flow rate may include: using a numerical optimization technique to determine the membrane combination having the minimum volumetric flow rate imbalance and the maximum total permeate flow rate.

Determining a membrane combination having a minimum volumetric flow rate imbalance and a maximum total permeate flow rate may include: comparing the calculated volumetric flow rate imbalance and total permeate flow rate with volumetric flow rate imbalances and total permeate flow rates of other membrane combinations to determine the membrane combination having the minimum volumetric flow rate imbalance and the maximum total permeate flow rate.

The volumetric flow rate imbalance may include a volumetric flow rate imbalance depending upon locations of the membrane modules, and the total permeate flow rate includes a total permeate flow rate until a predetermined point in time. The volumetric flow rate imbalance depending upon the locations of the membrane modules may be calculated based on permeate flow rates at predetermined locations of the membrane modules, the number of reverse osmosis membrane modules and the maximum permeate flow rate, and the total permeate flow rate until the predetermined point in time may be calculated based on the permeate flow rates of the reverse osmosis membrane modules at a predetermined point in time.

The water flux and the salt flux of the membrane module may be calculated based on a coefficient of water flux and a coefficient of salt flux included in the read parameters, and the coefficient of water flux and the coefficient of salt flux may be calculated from the properties of each membrane, or calculated by a linear equation obtained by deriving the linear equation from a curve fitted to a plot based on tradeoff relation.

The seawater desalination method may further include applying the membrane combination, which is determined to have the minimum volumetric flow rate imbalance and the maximum total permeate flow rate, to the membrane module.

According to the present invention, it is possible to obtain high-efficiency module combination information in light of costs and energy so as to satisfy a target amount and quality of water in a reverse osmosis membrane filtering seawater desalination plant, thereby realizing an efficient plant operation method. Further, it is possible to minimize time, costs and efforts for determining the optimized arrangement.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
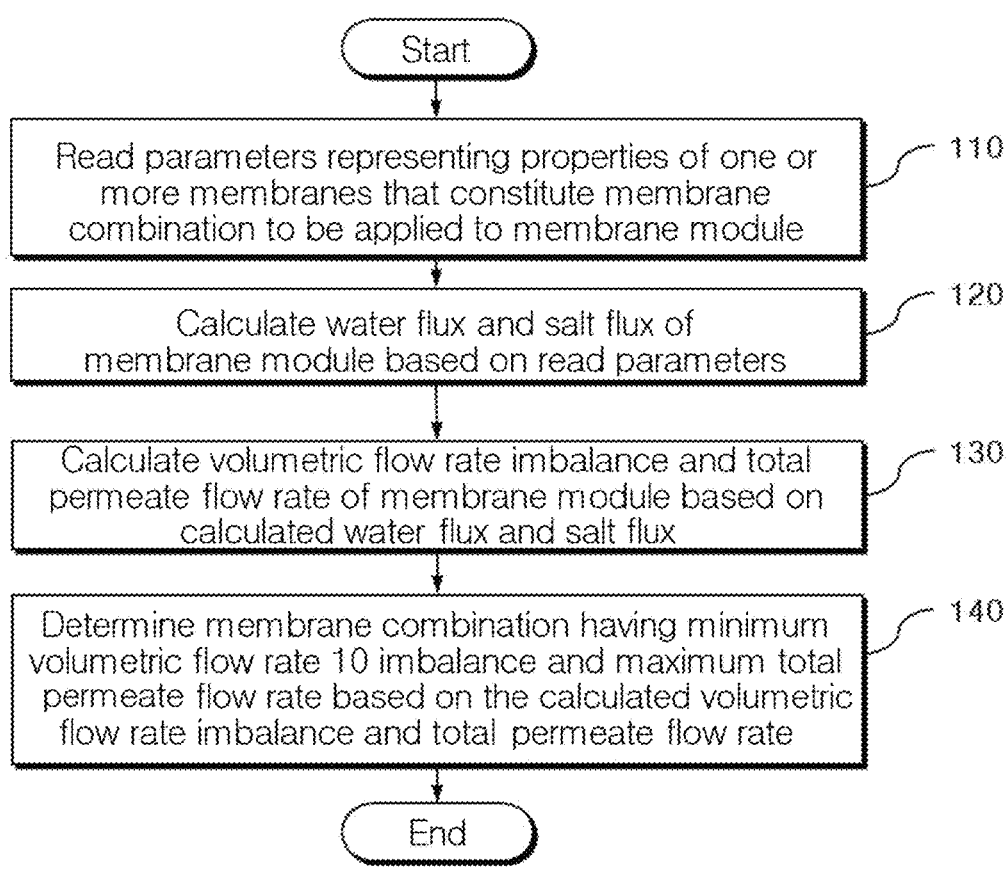
FIG. 1 is a flowchart of a seawater desalination method according to one embodiment of the present invention.

Prior to the detailed description of the present invention, an outline of solutions to problems to be solved by the present invention or key technological concepts will be first presented for convenience of understanding.

In accordance with one embodiment of the present invention, a seawater desalination method includes: reading parameters representing properties of one or more membranes constituting a membrane combination to be applied to each membrane module; calculating water flux and salt flux of the membrane modules based on the read parameters; calculating a volumetric flow rate imbalance and a total permeate flow rate of the membrane modules based on the calculated water flux and salt flux; and determining a membrane combination having a minimum volumetric flow rate imbalance and a maximum total permeate flow rate based on the calculated volumetric flow rate imbalance and total permeate flow rate.

Hereinafter, exemplary embodiments of the invention will be described in detail with reference to the accompanying drawings so as to be easily realized by those skilled in in the art. However, it will be apparent to those skilled in the art that these embodiments are provided for illustration only and the present invention is not limited thereto.

It should be noted that the same or similar components in the drawings are designated by the same reference numerals throughout the specification although they are shown in different drawings. For the purposes of clarity and simplicity, a detailed description of known functions and configurations incorporated herein will be omitted when it may make the subject matter of the present invention unclear In a seawater desalination method using reverse osmosis (RO) membrane modules, a difference in net driving force between inflow water channels must be reduced in order to achieve high efficiency membrane performance in light of the amount and quality of produced water. Here, the difference of the net driving force is caused by an osmotic pressure gradient due to difference in salinity between the inflow water channels, and a transmembrane pressure gradient of pressure drop due to hydraulic resistance. This can be solved by optimizing combination of the membrane modules. To optimize the combination of the membrane modules, it is necessary to accurately measure performance of the membrane in consideration of locations of the membranes. However, conventional techniques are merely included as a partial function in a software program developed to evaluate performance of membrane manufacturers' own membrane modules. In this program, although it is possible to evaluate performance of a module combination arbitrarily set by a user, 1) the program does not offer any function of searching for an optimized module arrangement. In addition, since this program is limited to a process performance simulation in a steady state, 2) a fouling effect depending upon time is not fully reflected in a membrane performance simulation. Accordingly, in this program, it is impossible to achieve the membrane performance simulation to which "less fouling potential" is applied as one among main advantages of ISD.

According to one embodiment of the invention, the seawater desalination method employs a numerical optimization technique to search for a membrane module combination, in which the volumetric flow rate imbalance depending upon the locations of the membrane modules is minimized, in various membrane module combination arrangements. To this end, an objective function is newly defined and applied to numerical optimization. An additionally constructed model employs phenomenologically verified mathematical equations for calculating membrane permeability performance, and particularly, reflects a physicochemical phenomenon such as membrane fouling, etc. unavoidably caused by concentration polarization and time when membrane filtering is performed, whereby reality of the simulation can be raised.

The seawater desalination method according to the embodiment of the invention constructs a mathematical prediction model capable of simulating a reverse osmosis membrane process, and applies the numerical optimization technique based on the this model, thereby presenting an optimized combination of the membrane modules arranged in a pressure vessel. The optimized combination refers to the membrane module combination that can satisfy a target amount and quality of water with energy consumption lower than that of a conventional method in a reverse-osmosis seawater desalination process. The constructed model reflects mathematical theories considering major factors significantly affecting the membrane filtering performance in order to improve reliability of prediction results. Further, performance simulation is enabled with regard to combinations of the membrane modules within the pressure vessel, thereby making it possible to evaluate a corresponding process under various conditions of the membrane module combinations. With regard to various combinations of the membrane modules, the performance simulation was performed by using membrane permeability parameters (for example, a coefficient of water flux and a coefficient of salt flux), which can reflect individual permeability performances of commercial reverse osmosis membrane modules, as model input data. The corresponding parameters are estimated and obtained through a mathematical prediction model and a numerical analysis method based on membrane performance data experimentally verified by a membrane manufacturer.

Next, a seawater desalination method according to one embodiment of the present invention will be described in detail.

Figure 3A:
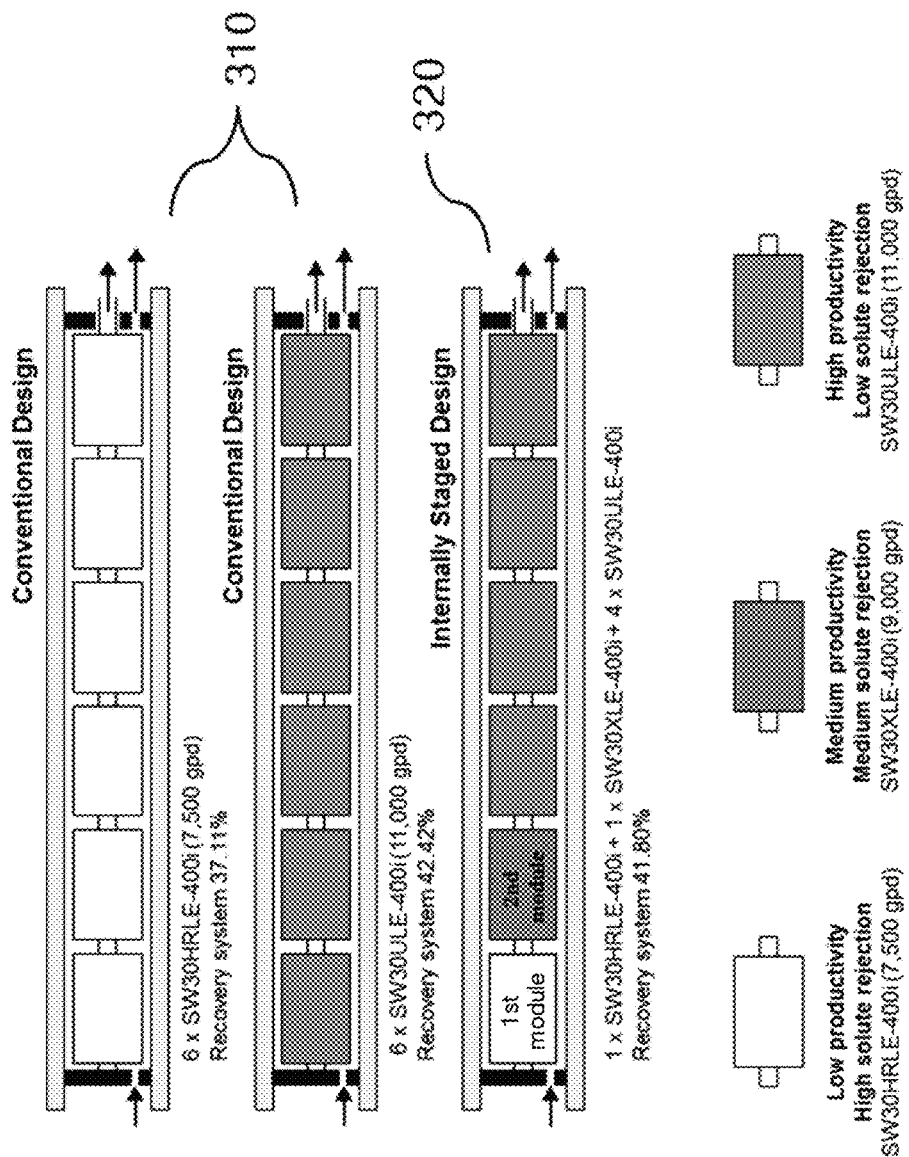
FIGS. 3a and 3b show a membrane module application method and results thereof.
Figure 3B:
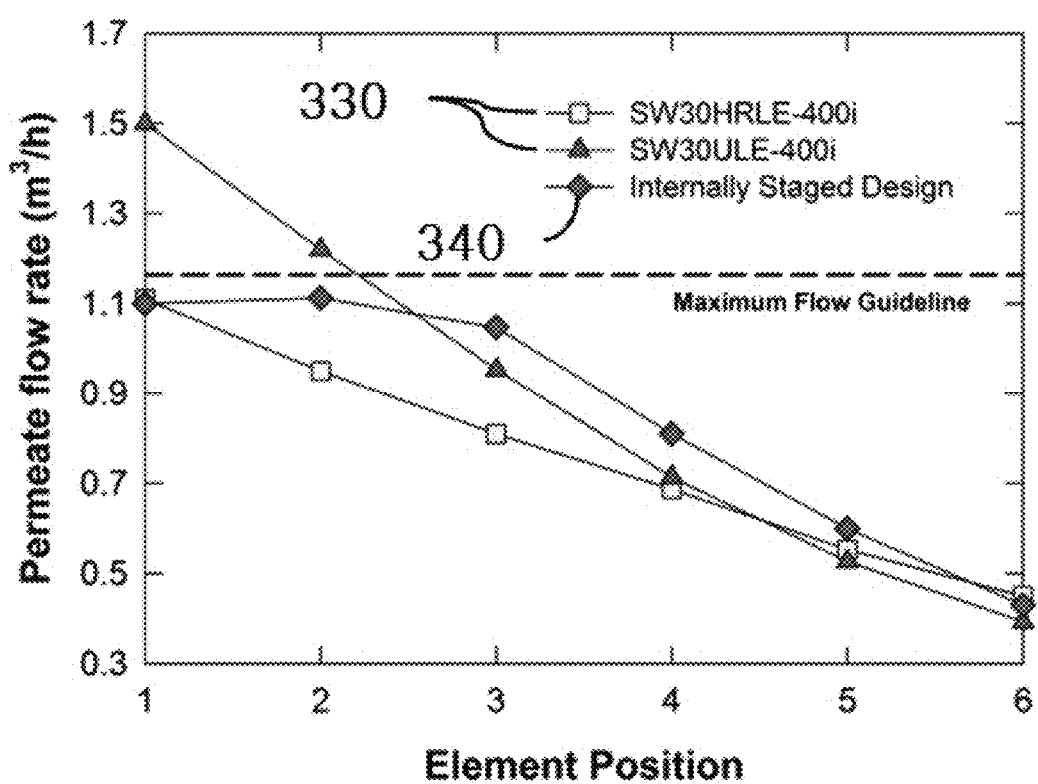

FIG. 1 is a flowchart of a seawater desalination method according to one embodiment of the present invention;

The seawater desalination method according to one embodiment of the invention arranges membranes, permeability to water and permeability to salt of which differ according to locations of membrane modules as shown in FIG. 3a, in order to decrease imbalance of a volumetric flow rate according to the locations of the membrane modules within a pressure vessel. In conventional methods 310, the same membranes are arranged in each of the membrane modules. However, in the seawater desalination method 320 according to the present invention, membranes, the permeability to water and the permeability to salt of which differ according to the locations of the membrane modules, are arranged. With this structure, as shown in FIG. 3b showing that the internal membrane module locations in the reverse osmosis membrane module arrangement are compared in terms of permeate flow rate, it is possible to decrease a difference in net driving pressure between the inflow water channels without exceeding a maximum flow guideline 340. As described above, for optimized membrane arrangement when membranes different depending upon the locations of the membrane modules are arranged, it is important to determine combinations of membranes to be applied to the membrane modules. To solve this problem, the seawater desalination method according to the embodiment of the invention optimizes the arrangement of the reverse osmosis membranes in the modules, as shown in FIG. 1.

In operation 110, parameters representing properties of each of one or more membranes constituting a membrane combination are read when the membrane combination is applied to the corresponding membrane module.

More specifically, if one or more membranes are applicable to the membrane module, there are various applicable membrane combinations. When one of these combinations is applied to the corresponding membrane module, the parameters representing the properties of the respective membranes that constitute the applied membrane combination are read so as to determine whether the corresponding membrane combination shows optimal performance. The parameters representing the properties of the respective membranes are previously calculated and stored as data. When a certain membrane combination is selected, the parameters corresponding to the selected membranes can be read from a database. The parameters may represent an area of a membrane, a spacer thickness for the inflow water channels, a coefficient of water flux of the membrane, and a coefficient of salt flux of the membrane. Each membrane module may employ two or more membranes different from each other. All of the membrane modules employ two or more membranes. Thus, the membrane modules employing the different membranes are provided. For example, different membranes may be applied to a first membrane module and a second membrane module, and the same membrane may be applied to the second membrane module and a third membrane module. Alternatively, all of the membrane modules may employ different membranes.

The coefficient of water flux and the coefficient of salt flux included in the parameters may be calculated from the properties of each membrane, or calculated based on a linear equation obtained by deriving the linear equation from a curve fitted to a plot based on tradeoff relation. That is, the coefficient of water flux and the coefficient of salt flux may be calculated using property information of the membranes provided by a membrane manufacturer, or calculated by the linear equation obtained from tradeoff relation between the coefficient of water flux and the coefficient of salt flux. This calculation will be described in detail with reference to FIG. 10a and FIG. 10b.

In operation 120, the read parameters are used to calculate the water flux and the salt flux of the membrane modules.

More specifically, the water flux and the salt flux are calculated using the parameters read in operation 110 when the membrane combination in operation 110 is applied. Since the water flux and the salt flux can vary depending upon the locations of the membrane modules even though one kind of membrane is given, the water flux and the salt flux of the whole membrane modules are calculated using the parameters read in operation 110 and the locations of the membrane modules to which the corresponding membranes are applied.

In operation 130, the volumetric flow rate imbalance and the total permeate flow rate of the membrane modules are calculated based on the calculated water flux and salt flux.

More specifically, the volumetric flow rate imbalance and the total permeate flow rate of the membrane modules are calculated as objective functions for optimizing the internal module arrangement based on the water flux and salt flux calculated in operation 120. The volumetric flow rate imbalance refers to a volumetric flow rate imbalance depending upon the locations of the membrane modules, and the total permeate flow rate refers to a total permeate flow rate until a predetermined point in time.

Figure 4:
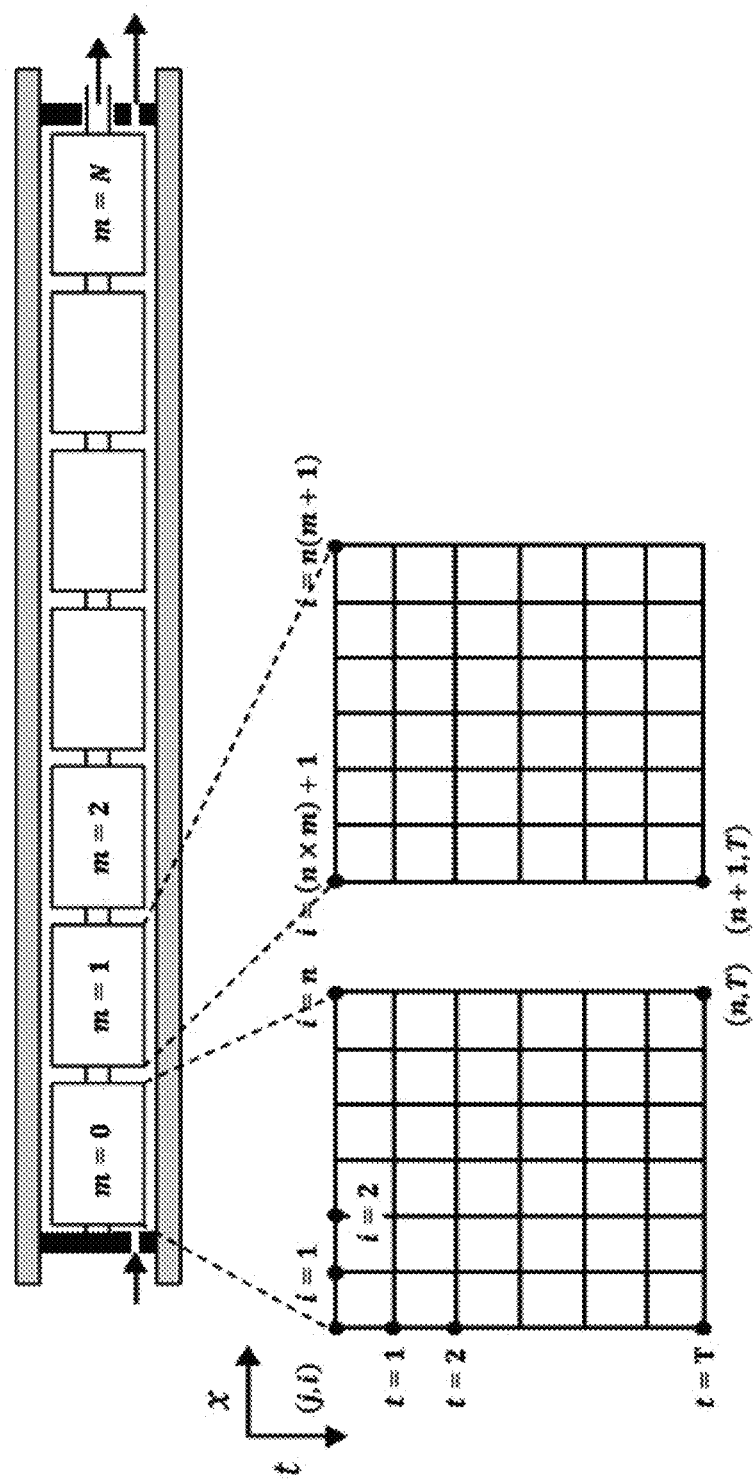
FIG. 4 shows elements of a membrane module with respect to time and space.
Figure 5:
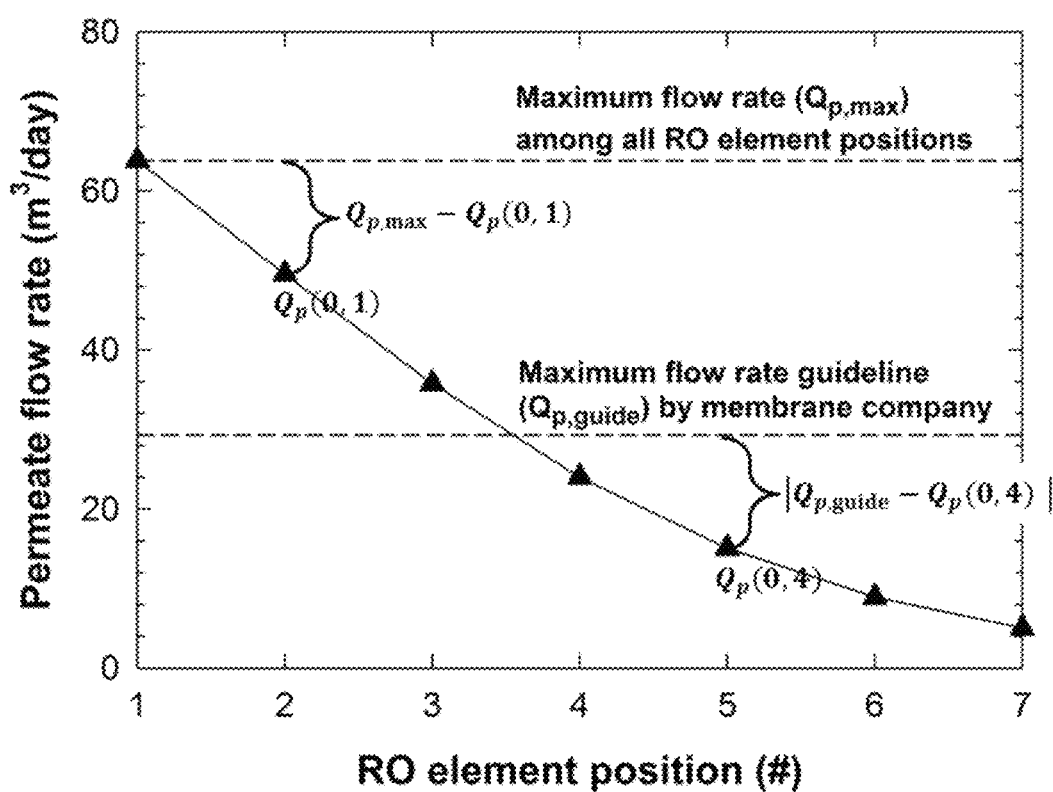
FIG. 5 shows calculation of imbalance between a permeate flow rate and a volumetric flow rate according to membrane module locations.

The volumetric flow rate imbalance depending upon the locations of the membrane modules can be calculated using a permeate flow rate at a predetermined membrane module location, the number of reverse osmosis membrane modules, and the maximum permeate flow rate. The maximum permeability flow rate may be a highest permeate flow rate recommended by a membrane manufacturer to reduce a fouling effect. This can be represented by Expressions 1 or 2 with reference to FIG. 4.

$$Y_1 = \frac{\sum_{m=0}^{N}(Q_{p,max} - Q_p(0,m))}{N \cdot Q_{p,max}}, \quad (1)$$

$$Y_1 = \sum_{m=0}^{N} |Q_{p,guide} - Q_p(0,m)|, \quad (2)$$

where Y is an objective function, N is a total number of reverse osmosis membranes, $Q_{p,max}$ is the maximum permeate flow rate, and $Q_{p,guide}$ is the maximum flow rate guideline.

The total permeate flow rate until a predetermined point in time may be calculated using the permeate flow rates of the reverse osmosis membrane modules at a predetermined point in time T. This can be represented by Expression 3.

$$Y_2 = \sum_{t=0}^{T} \sum_{m=0}^{N} Q_p(t,m) \quad (3)$$

In operation 140, the calculated volumetric flow rate imbalance and total permeate flow rate are used to derive the membrane combination having the minimum volumetric flow rate imbalance and the maximum total permeate flow rate.

More specifically, the membranes may be variously combined and applied to the membrane modules in operation 110. To have the optimized membrane combination among various membrane combinations, the volumetric flow rate imbalance and the total permeate flow rate calculated in operation 130 are used. That is, the membrane combination having the minimum volumetric flow rate imbalance and the maximum total permeate flow rate is determined.

To reduce time needed for determining the membrane combination, a numerical optimization technique is used to select the membrane combination having the minimum volumetric flow rate imbalance and the maximum total permeate flow rate. The numerical optimization technique may employ pattern search. Alternatively, the calculated volumetric flow rate imbalance and total permeate flow rate may be compared with the volumetric flow rate imbalance and total permeate flow rate applied to different membrane combinations, and then the membrane combination may be selected to have the minimum volumetric flow rate imbalance and the maximum total permeate flow rate.

Figure 2:
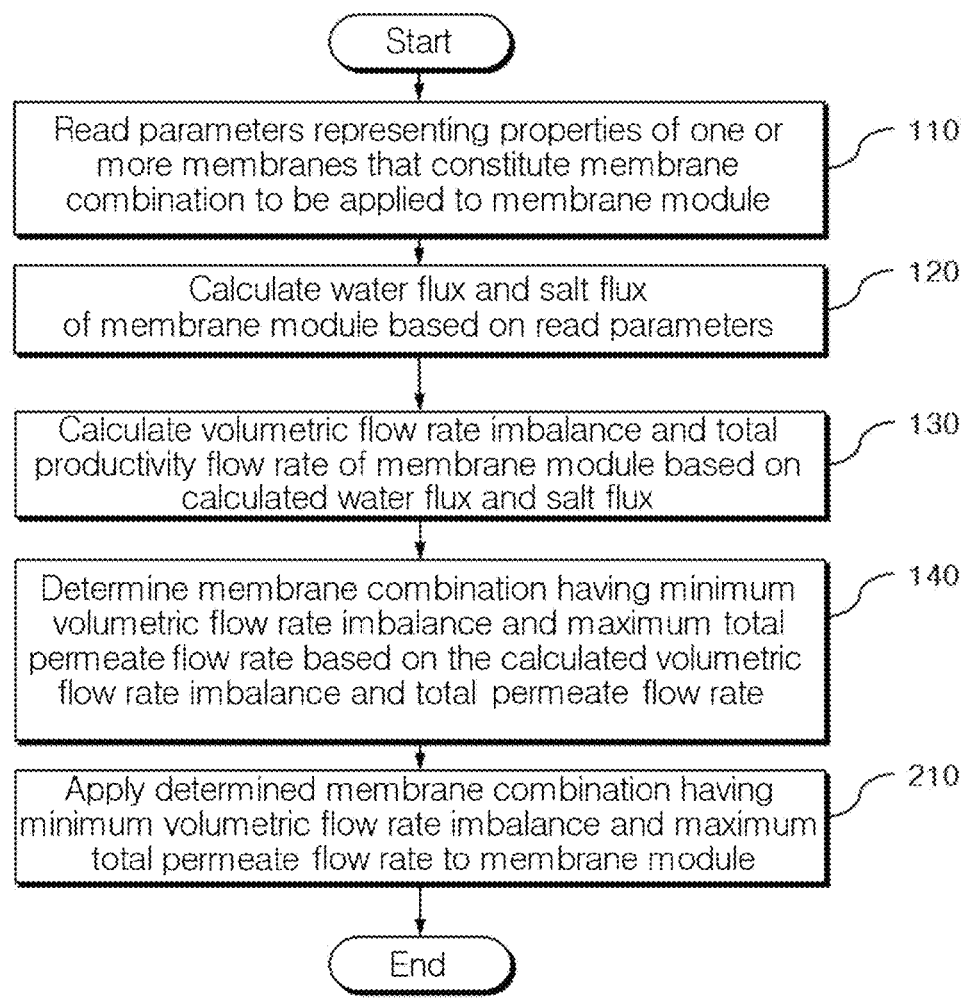
FIG. 2 is a flowchart of a seawater desalination method according to another embodiment of the present invention.

In operation 210 of FIG. 2, the determined membrane combination having the minimum volumetric flow rate imbalance and the maximum total permeate flow rate is applied to the corresponding membrane module.

More specifically, the membrane combination determined in operation 140 to have the minimum volumetric flow rate imbalance and the maximum total permeate flow rate is applied to the corresponding membrane module.

Figure 6:
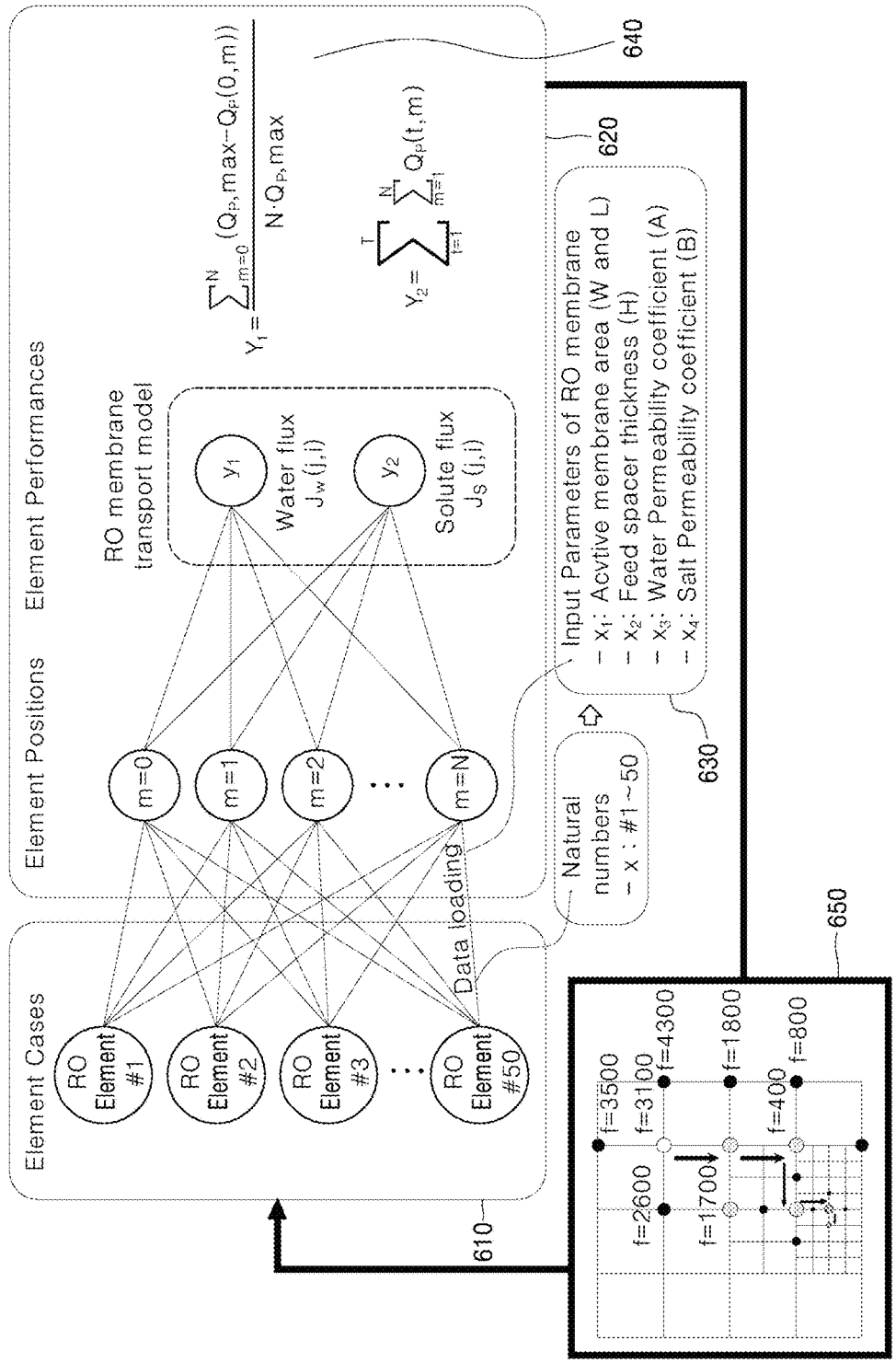
FIG. 6 shows arrangement optimization of reverse osmosis membrane modules according to one embodiment of the present invention.

FIG. 6 shows arrangement optimization of reverse osmosis membrane modules according to one embodiment of the present invention.

The membrane parameters needed to optimize the reverse osmosis membrane modules are constructed from reverse osmosis membranes (610). The membrane parameters may include the coefficient of water flux and the coefficient of salt flux. To obtain the coefficient of water flux and the coefficient of salt flux of the membrane, the following two methods may be used.

Figure 10A:
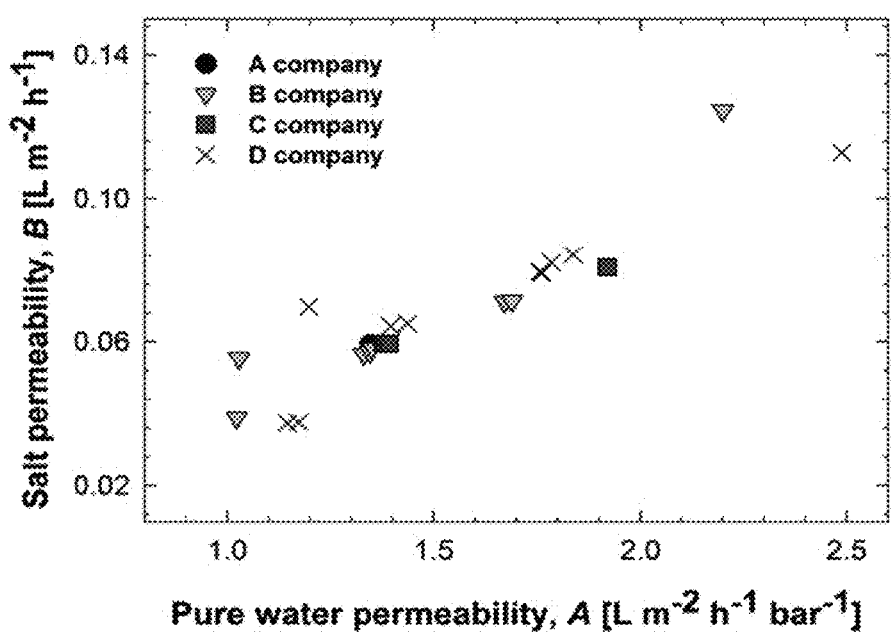
FIGS. 10a and 10b are graphs showing a coefficient of water flux and a coefficient of salt flux.

First, the coefficient of water flux and the coefficient of salt flux may be extracted based on the performance of the commercialized membrane. To extract the coefficient of water flux and the coefficient of salt flux of the commercialized membrane, membrane performance data and membrane module information (specification) under a certain driving condition of the corresponding membrane are needed. Based on membrane module information provided by a membrane manufacturer and membrane performance data estimated by a membrane performance prediction program for predicting and evaluating the membrane performance, it is possible to extract the coefficient of water flux and the coefficient of salt flux through a membrane mass transport expression. The extracted water and salt flux coefficients are as shown in FIG. 10a.

On the other hand, the coefficient of water flux and the coefficient of salt flux may be extracted based on a linear equation obtained by deriving the linear equation from a curve fitted to a plot based on the tradeoff relation between the coefficient of water flux and the coefficient of salt flux. Thus, it is possible to generalize the coefficient of water flux and the coefficient of salt flux of irregularly arranged membranes into a linear relation, and therefore convergence is enhanced when the optimized membrane combination is determined. This can be represented by Expression 4.

<Expression 4>

$$\frac{P_W}{P_S} = \frac{\lambda}{(P_W)^\beta}$$

$$A = \frac{P_W}{L} \frac{M_w}{R_g T}$$

$$B = \frac{P_S}{L}$$

$$B = \frac{L^\beta}{\lambda} \left(\frac{R_g T}{M_W}\right)^{\beta+1} A^{\beta+1}$$

$P_W$ and $P_S$: Intrinsic properties of active layer
A and B: Bulk transport properties of membrane
$P_W$ = membrane permeability to water
$P_S$ = membrane permeability to salt $\frac{P_W}{P_S}$ = water/salt permeability selectivity $\lambda$ and $\beta$ = empirical fitting parameters
$\beta$ = the slope of the tradeoff line
L = active layer thickness (nm)
$M_W$ = molecular weight (g/mol)
$R_g$ = ideal gas constant (Pa L/K mol)

Figure 10B:
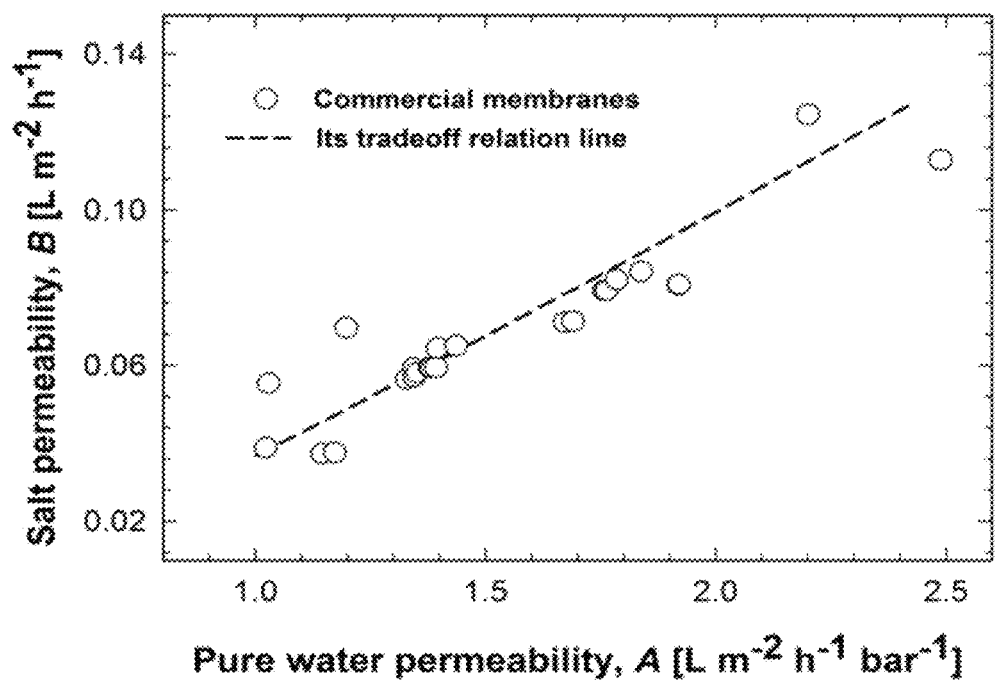

The linear correlation extracted by the foregoing expression is shown in FIG. 10b.

If the combination of membranes to be applied to the membrane module is determined, the parameters of the corresponding membranes are read (630), and applied to the corresponding membrane module (620). The water flux and the salt flux of the membrane module are calculated using the parameters of the membranes applied to the membrane module, and thus a value of an objective function (640) is calculated.

To determine the optimal membrane combination by comparing various membrane combinations to be applied to the membrane modules, a numerical optimization technique may be used instead of comparing all of the membrane combinations, thereby rapidly selecting the optimal membrane combination. Pattern search may be used as the numerical optimization technique. The pattern search, as one of the numerical optimization techniques, is used, thereby rapidly determining the optimal membrane combination.

Figure 11A:
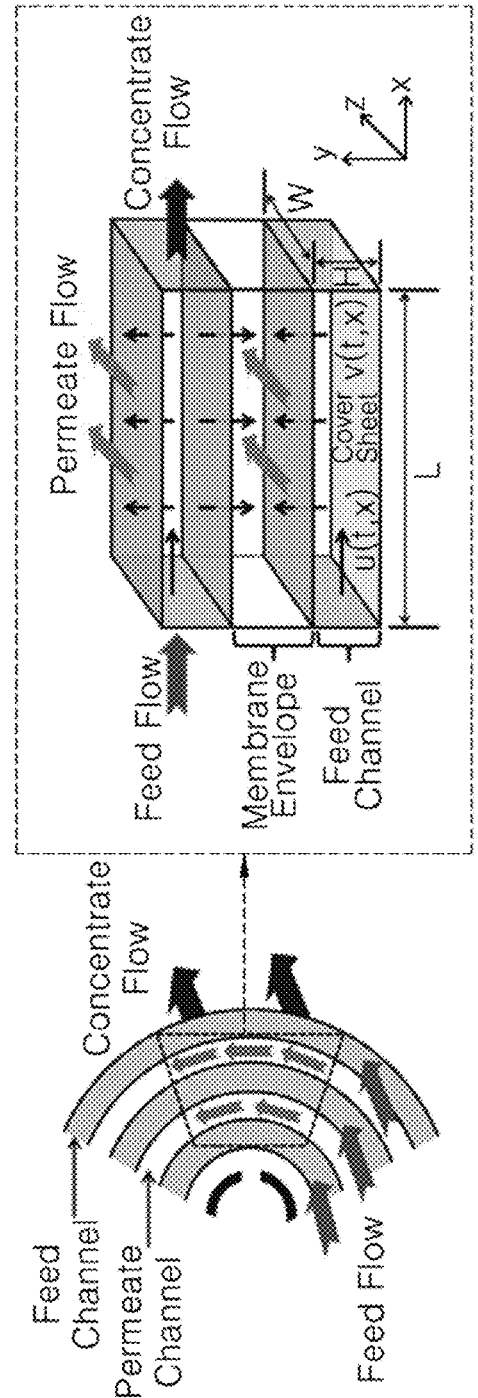
FIGS. 11a to 11d show a process for obtaining a permeate flow rate from a membrane parameter and a membrane module combination to which the corresponding parameter is applied.
Figure 11B:
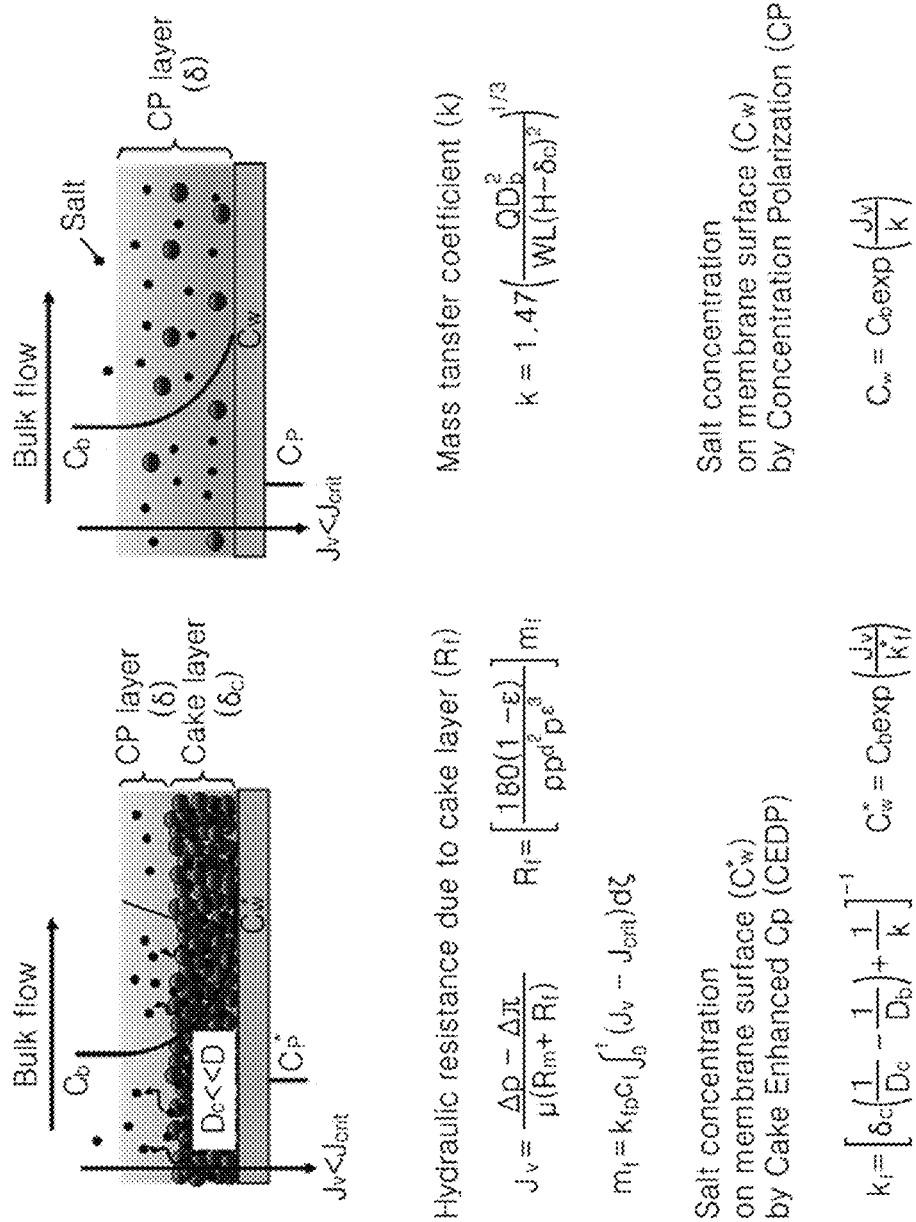
Figure 11C:
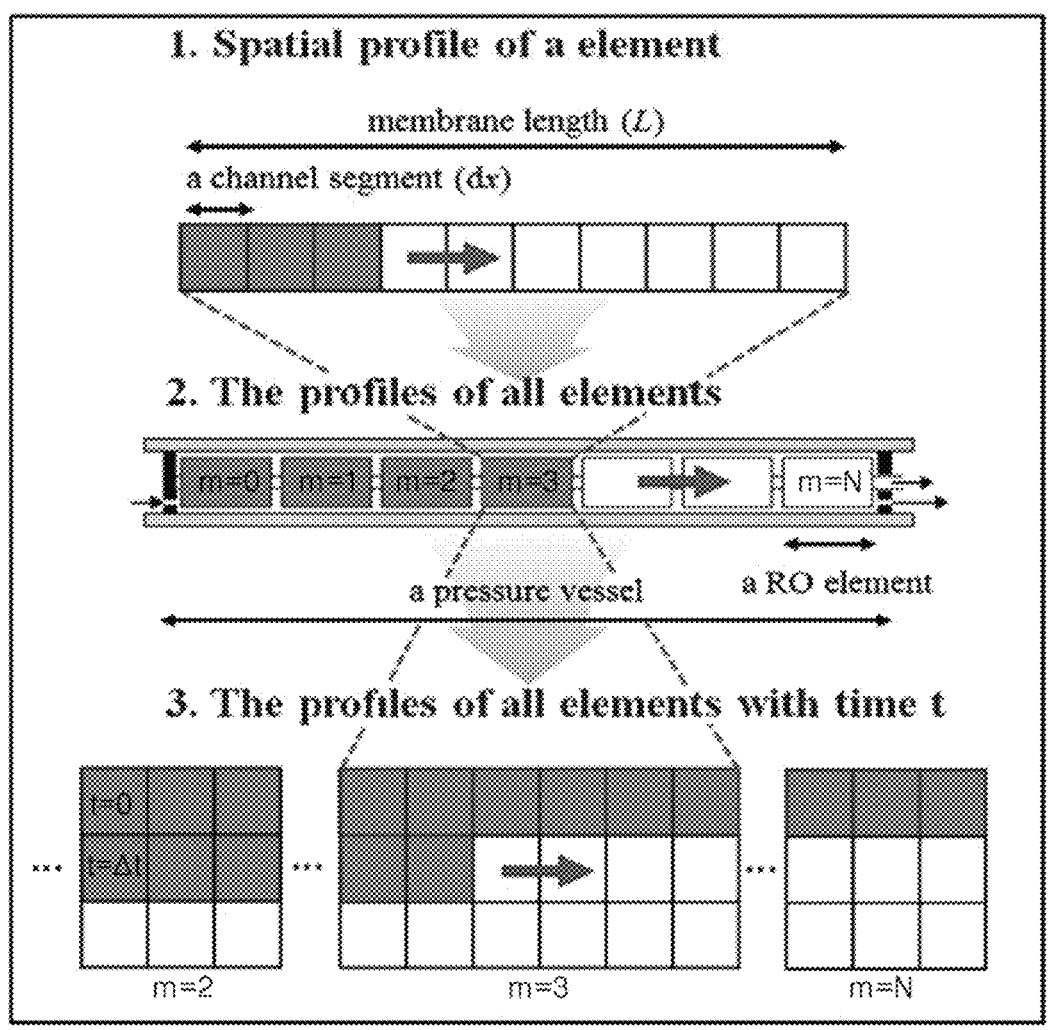
Figure 11D:
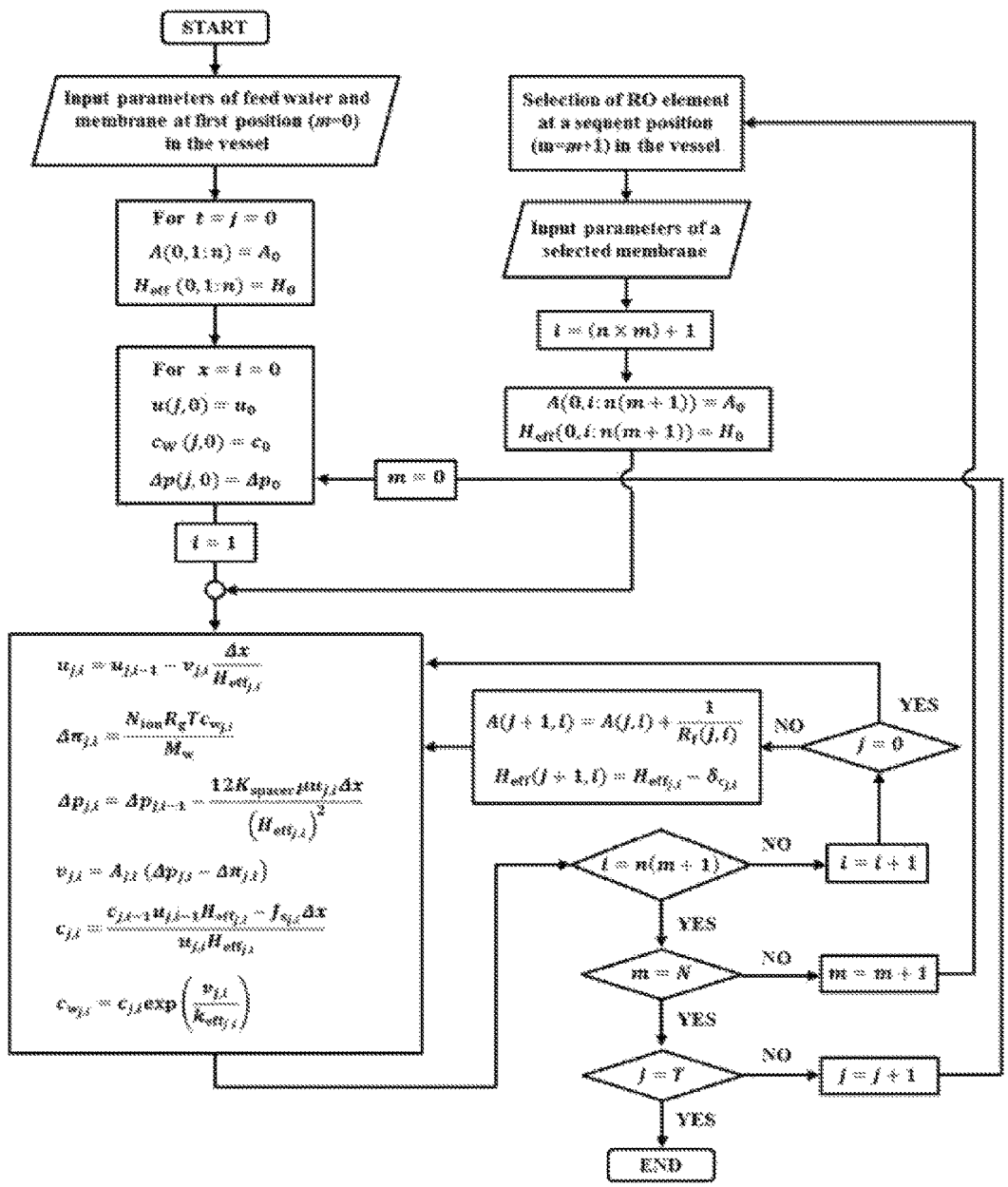

When the selected membrane combination is applied to the membrane module, values for modeling, an objective function, and the like, such as a membrane mass transport, a feed channel condition, hydraulic resistance due to a cake layer, cake enhanced concentration polarization (CECP), mass transfer coefficient (k), and the like, may be obtained, as shown in FIGS. 11a and 11b. FIG. 11c shows that the membrane modules are changed over time. In accordance with the flowchart of FIG. 11d, the foregoing values are updated and constructed.

Figure 7:
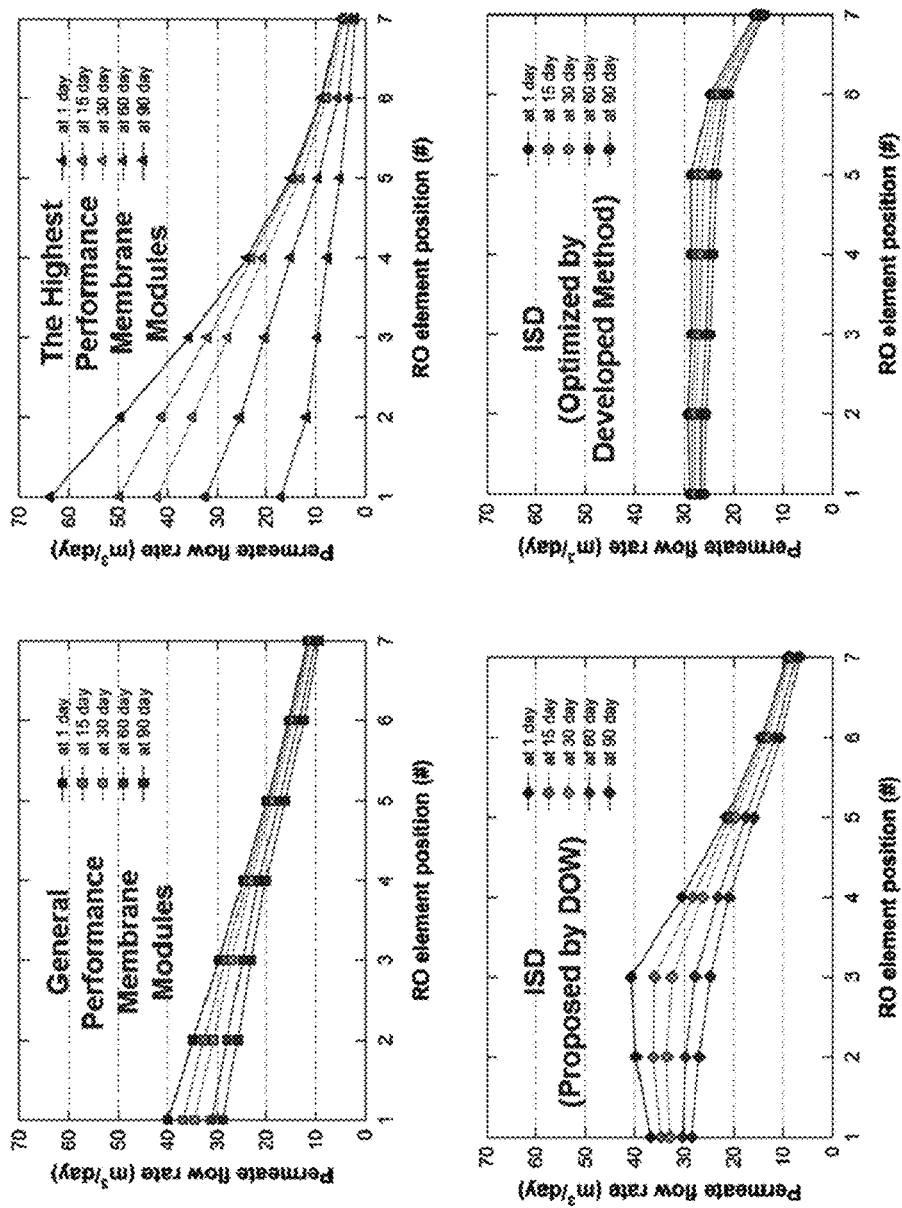
FIGS. 7 to 9 show results of arrangement optimization of reverse osmosis membrane modules according to one embodiment of the present invention.
Figure 8:
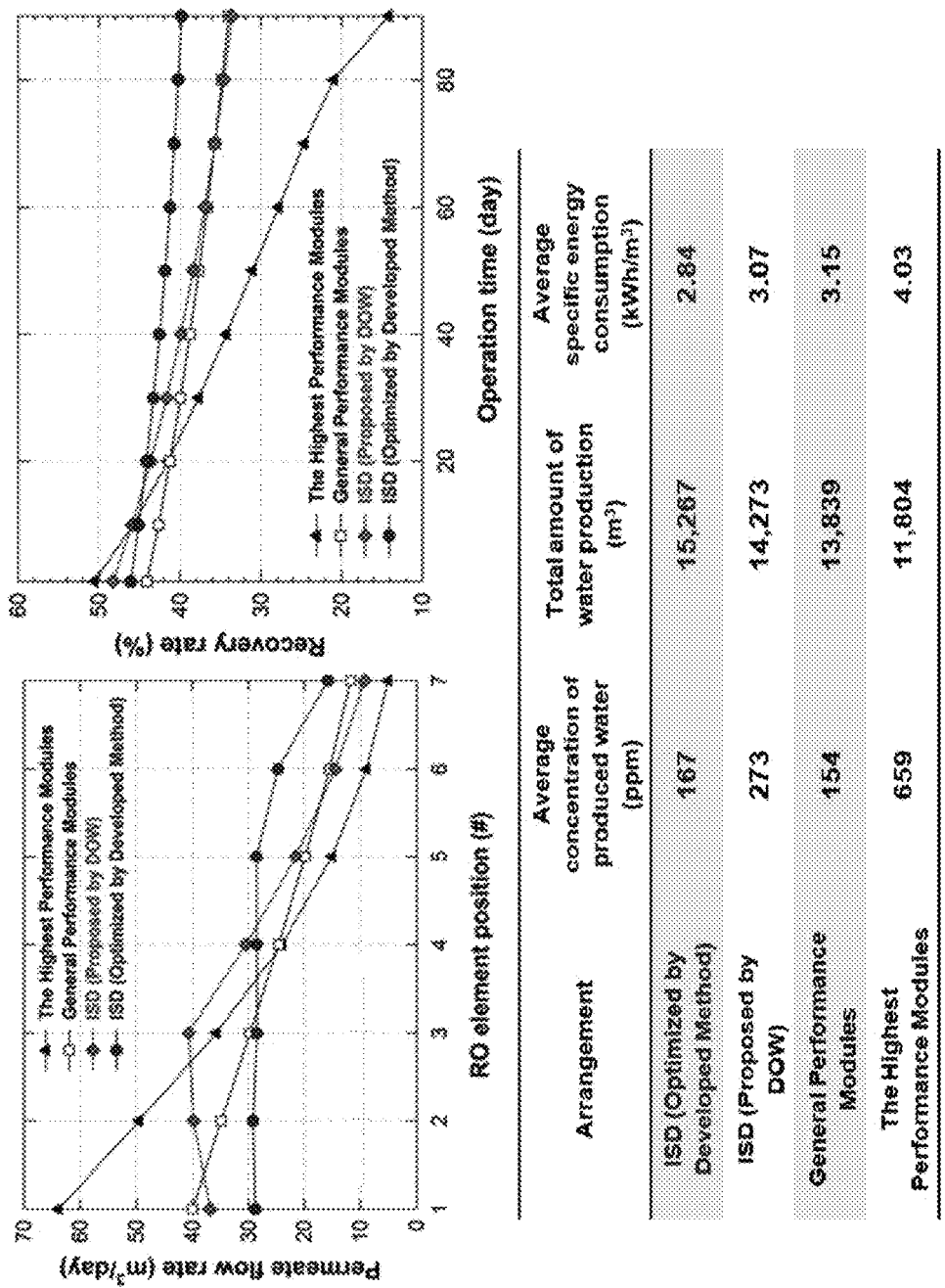
Figure 9:
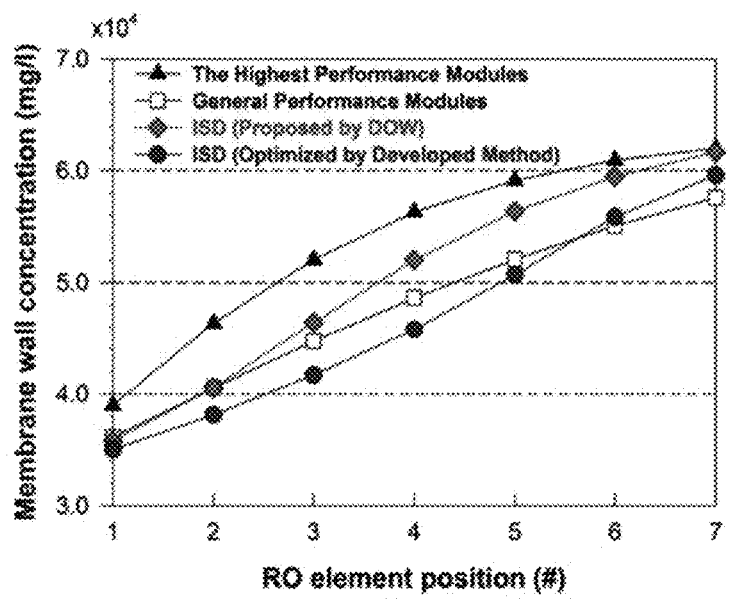

FIGS. 7 to 9 show results of arrangement optimization of reverse osmosis membrane modules according to one embodiment of the present invention.

As shown in FIG. 7, the graph of the seawater desalination method according to one embodiment of the invention shows more constant gradients than other techniques. Thus, it will be appreciated that the reverse osmosis flow rate is constant regardless of the locations of the reverse osmosis membranes. In addition, as shown in FIG. 8, water productivity in each membrane module is more enhanced than those of other techniques, and does not decrease even though time passes. These are the effects expected by determining and applying the optimized membrane combination. Further, as shown in FIG. 9, it will be understood that concentration of salt produced on the surface of the membrane is reduced.

According to one embodiment of the present invention, a seawater desalination apparatus includes a storage device for storing membrane parameters and a processor for determining optimal arrangement of reverse osmosis membrane modules. The processor reads membrane parameters from the storage device, calculates water flux and salt flux of the membrane modules, calculates a volumetric flow rate imbalance and a total permeate flow rate, and determines a membrane combination having a minimum volumetric flow rate imbalance and a maximum total permeate flow rate. Detailed description of the seawater desalination apparatus according to the embodiment corresponds to that of the seawater desalination method shown in FIGS. 1 and 2.

The embodiments of the present invention may be realized in the form of program instructions which can be implemented through various computer components, and may be recorded in a computer-readable storage medium. The computer-readable storage medium may include a program instruction, a local data file, a local data structure, and the like either alone or in combination thereof. The program instruction recorded in the computer-readable storage medium may be any program instruction particularly designed and structured for the present invention or known to those skilled in the field of computer software. Examples of the computer-readable storage medium include magnetic recording media such as hard disks, floppy disks and magnetic tapes, optical data storage media such as CD-ROMs or DVD-ROMs, magneto-optical media such as floptical disks, and hardware devices, such as a read-only memory (ROM), random-access memory (RAM) and flash memory, which are particularly structured to store and implement the program instruction. Examples of the program instruction include not only machine language code formatted by a compiler but also high level language code which can be executed by a computer using an interpreter. The hardware devices may be configured to be operated by one or more software modules or vice versa to perform the processes according to the present disclosure.

Although some embodiments have been described herein, it should be understood by those skilled in the art that these embodiments are given by way of illustration only, and that various modifications, variations, and alterations can be made without departing from the spirit and scope of the invention. Therefore, the scope of the present invention should be limited only by the accompanying claims and equivalents thereof.

What is claimed is:

1. A seawater desalination method for optimizing an arrangement of membranes in a membrane module having a plurality of sequential locations for receiving the membranes, the seawater desalination method performed by a seawater desalination apparatus, said seawater desalination apparatus comprising a processor and a storage device storing membrane parameters, the seawater desalination method comprising:
    reading, from the storage device, parameters of more than one type of membrane of a plurality of types of membranes;
    identifying, by the processor, a plurality of combinations of membranes for installing in the membrane module;
    calculating, by the processor, a water flux and a salt flux of the membrane module having a first combination of membranes of the identified plurality of combinations of membranes;
    determining, by the processor, a volumetric flow rate imbalance and a total permeate flow rate of the membrane module having the first combination of membranes of the identified plurality of combinations of membranes, wherein the determination of the total permeate flow rate of the membrane module comprises determining a total permeate flow of the membrane module from an initial time point to a predetermined time point;
    repeating the step of calculating the water flux and salt flux, and the step of determining the volumetric flow rate imbalance and the total permeate flow rate for another combination of membranes, until a combination of membranes having a volumetric flow rate imbalance and a permeate flow rate is identified satisfying a preset criterion; and
    selecting the combination of membranes satisfying the preset criterion in order to install membranes in the membrane module
    wherein the volumetric flow rate imbalance is calculated according to the following equation, $$Y_1 = \frac{\sum_{m=0}^{N}(Q_{p,max} - Q_p(0,m))}{N \cdot Q_{p,max}}$$

where
    $Y_1$ is an objective function,
    N is a total number of reverse osmosis membranes,
    $Q_{p,max}$ is the maximum permeate flow rate, and
    $Q_p(0,m)$ is a permeate flow rate at predetermined location (m) of the membrane module.

2. The seawater desalination method according to claim 1, selecting the combination of membranes satisfying the preset criterion is performed, by the processor, using a numerical optimization technique.

3. The seawater desalination method according to claim 2, wherein the numerical optimization technique comprises pattern search.

4. The seawater desalination method according to claim 1, wherein the preset criterion comprises a minimum volumetric flow rate imbalance among the plurality of combinations of membranes, or wherein the preset criterion comprises a maximum permeate flow rate among the plurality of combinations of membranes.

5. The seawater desalination method according to claim 1, wherein the determination of the volumetric flow rate imbalance of the membrane module comprises determining the volumetric flow rate imbalance of the membrane module based on a volumetric flow rate imbalance of each membrane of membranes received in the plurality of sequential locations of the membrane module.

6. The seawater desalination method according to claim 1, wherein
    the water flux and the salt flux of the membrane module are calculated based on a coefficient of water flux and a coefficient of salt flux included in the read parameters, and
    the coefficient of water flux and the coefficient of salt flux are calculated from the properties of each membrane, or calculated by a linear equation obtained by deriving the linear equation from a curve fitted to a plot based on tradeoff relation.

7. The seawater desalination method according to claim 1, wherein each of the plurality of combinations of membranes comprises two or more membranes different from each other.

* * * * *